(12) United States Patent
Wolf

(10) Patent No.: US 7,611,191 B2
(45) Date of Patent: Nov. 3, 2009

(54) AIR GUIDANCE DEVICE FOR THE REAR SECTION OF A MOTOR VEHICLE

(75) Inventor: Thomas Wolf, Riedstadt (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 0 days.

(21) Appl. No.: 12/112,193

(22) Filed: Apr. 30, 2008

(65) Prior Publication Data

US 2008/0272616 A1   Nov. 6, 2008

(30) Foreign Application Priority Data

May 4, 2007  (DE) ........................ 10 2007 020 874

(51) Int. Cl.
B60J 9/00 (2006.01)
(52) U.S. Cl. ................. 296/180.1; 296/180.2
(58) Field of Classification Search ............. 296/180.1, 296/180.2, 180.3, 180.4, 180.5
See application file for complete search history.

(56) References Cited

U.S. PATENT DOCUMENTS

2008/0211261 A1 * 9/2008 Wegener .................. 296/180.5

FOREIGN PATENT DOCUMENTS

| DE | 30 03 565 C2 | 8/1981 |
|---|---|---|
| DE | 199 42 061 C2 | 3/2000 |
| DE | 10 2004 030 571 B4 | 3/2007 |
| WO | WO 2006/119746 A1 * | 11/2006 |

OTHER PUBLICATIONS

German Patent and Trademark Office search report, dated Jan. 15, 2008.

* cited by examiner

Primary Examiner—Lori L Lyjak

(57) ABSTRACT

An air guidance device for the rear section of a motor vehicle. The motor vehicle has at least one first tail light and at least one second tail light. The tail lights are disposed at the respective sides of the vehicle and they are spaced apart by a spacing distance in the transverse direction of the vehicle. The air guidance device is movable between a rest position, in which the air guidance device lies substantially within the vehicle contour, and an operating position, in which the air guidance device extends beyond the vehicle contour. In the rest position, the air guidance device covers at least partially the area between the first tail light and the second tail light. The maximum width of the air guidance device is greater than the spacing device between the first tail light and the second tail light.

8 Claims, 2 Drawing Sheets

AIR GUIDANCE DEVICE FOR THE REAR SECTION OF A MOTOR VEHICLE

CROSS-REFERENCE TO RELATED APPLICATION

This application claims the priority, under 35 U.S.C. § 119, of German application DE 10 2007 020 874.1, filed May 4, 2007; the prior application is herewith incorporated by reference in its entirety.

BACKGROUND OF THE INVENTION

Field of the Invention

The invention relates to an air guidance device for the rear section of a motor vehicle, where the motor vehicle in its rear section has at least a first lighting device and at least a second lighting device. The first lighting device and the second lighting device are respectively associated with one vehicle side and are spaced apart in the transverse direction of the vehicle. The air guidance device is designed so it can be moved between a rest position, in which the air guidance device lies substantially within the vehicle contour, and an operating position, in which the air guidance device extends beyond the vehicle contour.

German patent DE 10 2004 030 571 B4 describes an air guidance device of a motor vehicle which comprises a spoiler. The spoiler may be adjusted, by means of an adjustment device, between a rest shape, in which it is located substantially within the vehicle contour, and an operational shape, in which it extends beyond the vehicle contour, where the spoiler presents a spoiler surface, which, at least in the operational shape of the spoiler during the movement of the motor vehicle, is exposed to the driving wind and as a result becomes aerodynamically active. The spoiler has a spoiler body and spoiler enlargements arranged on both lateral ends of the spoiler body, whose position with respect to the spoiler body changes during the course of the adjustment from the rest shape to the operational shape in the sense of an enlargement of the aerodynamically active spoiler surface area to increase the aerodynamic effect. A substantial drawback of the air guidance device described in DE 10 2004 030 571 B1 is that it is very expensive and mechanically complicated as far as its construction and assembly are concerned.

SUMMARY OF THE INVENTION

It is accordingly an object of the invention to provide an air guidance device, which overcomes the disadvantages of the heretofore-known devices and methods of this general type and which develops as large as possible an aerodynamic effect while simultaneously presenting a structure that is mechanically simple, robust and resistant.

With the foregoing and other objects in view there is provided, in accordance with the invention, an aerodynamic assembly for a rear section of a motor vehicle, the rear section of the motor vehicle having at least one first lighting device and at least one second lighting device, the first and second lighting devices being disposed at a respective side of the vehicle and at a spacing distance from one another in a transverse direction of the vehicle, the assembly comprising:

an air guidance device movably disposed between a rest position, wherein the air guidance device lies substantially within a vehicle contour, and an operating position, wherein the air guidance device projects beyond the vehicle contour;

the air guidance device, in the rest position thereof, covering at least partially a region between the at least one first lighting device and the at least one second lighting device; and the air guidance device having a maximum width greater than the spacing distance between the at least one first lighting device and the at least one second lighting device.

In other words, the air guidance device according to the invention, in its rest position, covers the area between the at least one first lighting device and the at least one second lighting device at least partially. The maximum width of the air guidance device is greater than the spacing distance, i.e, the separation of the at least one first lighting device from the at least second lighting device. In this way, the air guidance device can be designed with a very large width, without the need to use mechanically complicated, additional deployable surfaces. The effect of the surface of a mechanically exceedingly robust air guidance device that is arranged at the rear side is increased according to the invention. The reduction of the lift and resistance is improved by the increase in the aerodynamic effect. The air guidance device is, moreover, arranged particularly far towards the rear on the motor vehicle, which improves the aerodynamic effect additionally.

It is advantageous for the air guidance device to be formed with a trailing edge (i.e., a stall edge) which extends at least substantially over the maximum width of the air guidance device.

In accordance with an additional feature of the invention, the air guidance device is advantageously formed with recesses whose design is such that the lighting devices are not covered, or at least substantially not covered, by the air guidance device in its position of repose.

In accordance with another feature of the invention, the lateral and the lower edge of the air guidance device in the area of the lighting devices can advantageously be designed to follow the contour of the lighting devices.

Advantageously, at least the areas of the air guidance device that cover the lighting devices are formed to be permeable to light.

Here, it can be advantageous for the air guidance device to be impermeable to light in the area between the lighting devices.

In accordance with a further feature of the invention, the permeability to light can be advantageously adjustable by the application of an electrical potential at least in the areas of the air guidance device that cover the lighting devices.

In accordance with a concomitant feature of the invention, the air guidance device may be formed to be permanently impermeable to light in the area between the lighting devices.

Other features which are considered as characteristic for the invention are set forth in the appended claims.

Although the invention is illustrated and described herein as being embodied in air guidance device for the rear section of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
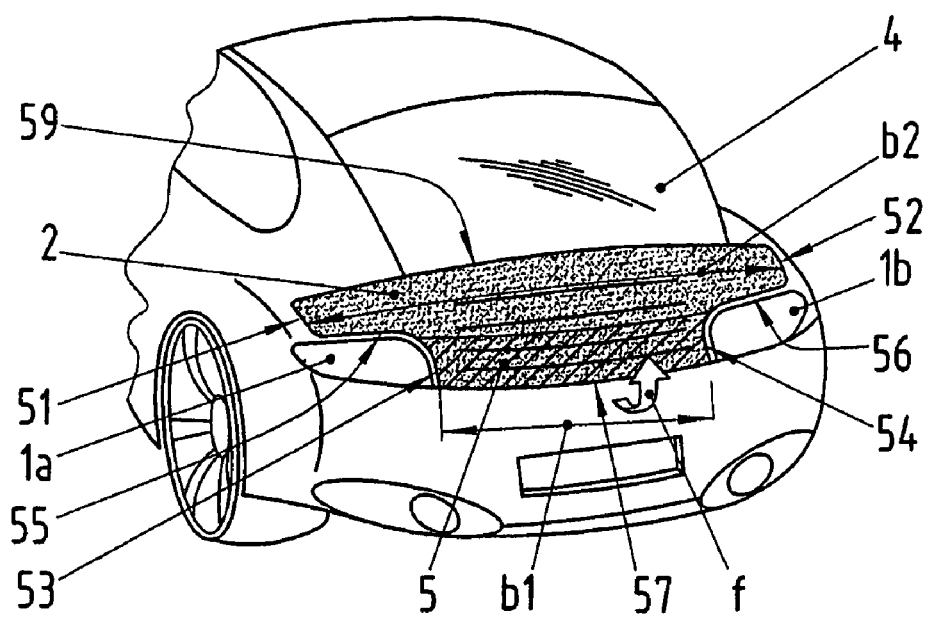
FIG. 1 is a rear perspective view of a motor vehicle with an air guidance device according to the invention.

Referring now to the figures of the drawing in detail and first, particularly, to FIG. 1 thereof, there is shown a rear portion of a motor vehicle. The motor vehicle is provided with a rear window 4 and an air guidance device 2, also referred to as a rear spoiler or wing assembly 2. The air guidance device 2, in the example shown, extends over almost the entire width of the rear section and, in the retracted state, i.e., in a rest position or position of repose, it lies substantially within the vehicle contour. The air guidance device 2 aligns in its rest position substantially flush with the vehicle contour.

In the illustrated exemplary embodiment, the rear section of the motor vehicle has a first lighting device 1a or tail light, which is assigned to the driver's side of the vehicle. Moreover, a second lighting device 1b or tail light is disposed on the passenger side. The two lighting devices 1a, 1b are spaced apart by a spacing distance b1 in the transverse direction of the vehicle. The area 5, whose size is delimited by the two lighting devices 1a, 1b, is covered by the air guidance device 2, when the air guidance device 2 is in the rest position. Above the lighting devices 1a, 1b and above the area 5 extending between the two lighting devices 1a, 1b, the air guidance device 2 is wider than the spacing distance b1 presented by the two lighting devices 1a, 1b with respect to each other. In this area, the air guidance device 2 has its maximum width b2, which is greater than the spacing distance b1 of the at least one lighting device 1a from the at least one second lighting device 1b. The air guidance device 2 is formed with lateral edges 51, 52, 53, 54, lower edges 55, 56, 57, and an upper edge 59. In the example shown, the lighting devices 1a, 1b are recessed in the surface of the air guidance device 2. The corresponding cutouts in the air guidance device 2 are configured such that—at least in the rest position of the air guidance device 2—the edges 53, 54, 55, 56 each substantially follow, in the area of the lighting devices 1a, 1b, the contour of the corresponding lighting device 1a or 1b. The lateral and lower edges 53, 54, respectively 55, 56 of the air guidance device 2 in the area of the lighting devices 1a, 1b correspond to the corresponding section of the lighting device 1a, 1b in question. The lower edges 55, 56, 57 of the air guidance device may preferably be formed with an aerodynamically active trailing edge (also referred to as a stall edge) over the width of the air guidance device 2. It is preferred for this trailing edge to be also effective in the rest position or the position of repose.

Figure 2:
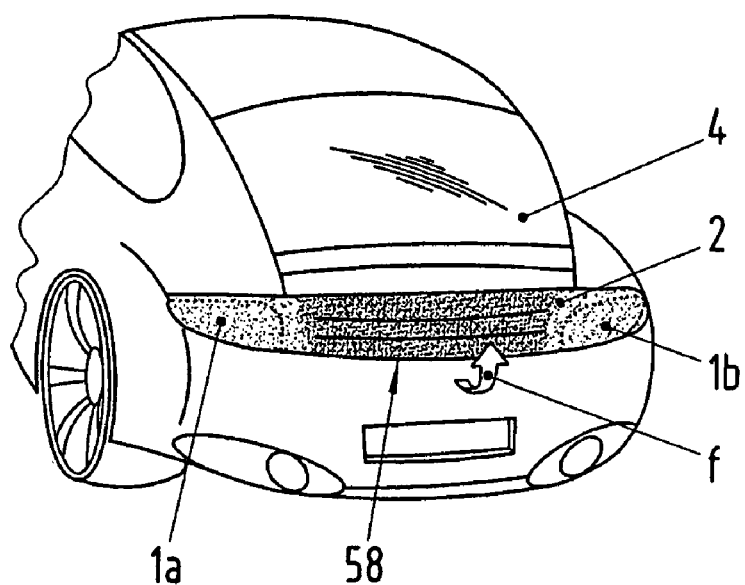
FIG. 2 is a similar view of the rear section of the motor vehicle with an air guidance device according to the invention.

FIG. 2 shows an additional example of an air guidance device 2 arranged in the rear section of a motor vehicle. A rear window 4 is also provided in the rear section in the depicted example. The air guidance device 2 shown in FIG. 2 covers the lighting devices 1a, 1b, when the air guidance device 2 is in its rest position. In its rest position, the air guidance device 2 also covers the area between the lighting devices 1a, 1b. The lower edge 58 of the air guidance device 2 is preferably designed as a continuous lower trailing edge. This trailing edge can preferably also become aerodynamically active when the air guidance position 2 is in its rest position. The areas of the air guidance device 2, which are indicated in the depicted example with broken lines and which cover the lighting devices 1a, 2b, according to an embodiment of the invention, are designed to be permeable to light, i.e., transparent or translucent, preferably transparent. It is also possible for areas that extend beyond and over the immediate area of the lighting devices 1a, 1b (shown in FIG. 2 by differences in the shading of the air guidance device 2, or marked in FIG. 3 as marginal areas 3) to be designed to be permeable to light. The remaining areas of the air guidance device 2, particularly substantially the area 5 (cf. FIG. 1), between the two lighting devices 1a, 1b can also be designed to be impermeable to light according to the exemplary embodiment shown in FIG. 2.

The air guidance device 2 can be moved out of the rest position shown in FIGS. 1 and 2 into an operating position which is not represented further in the drawing. This movement is indicated by the arrow f. The corresponding reversed movement is also provided for. In the operating position, which is not shown further in the drawing, the air guidance device 2 can deploy its full aerodynamic effect.

Figure 3:
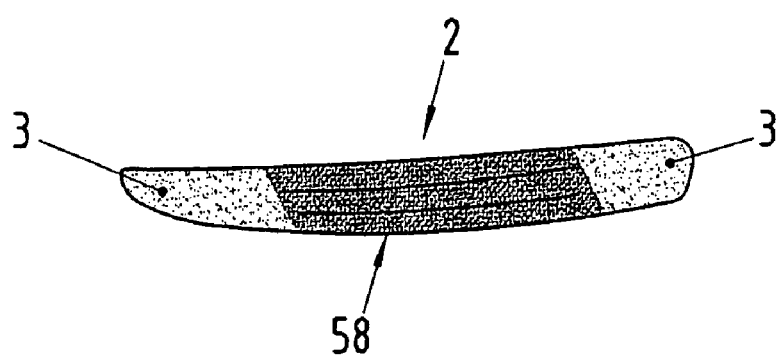
FIG. 3 is an isolated view of an air guidance device.
Figure 2A:
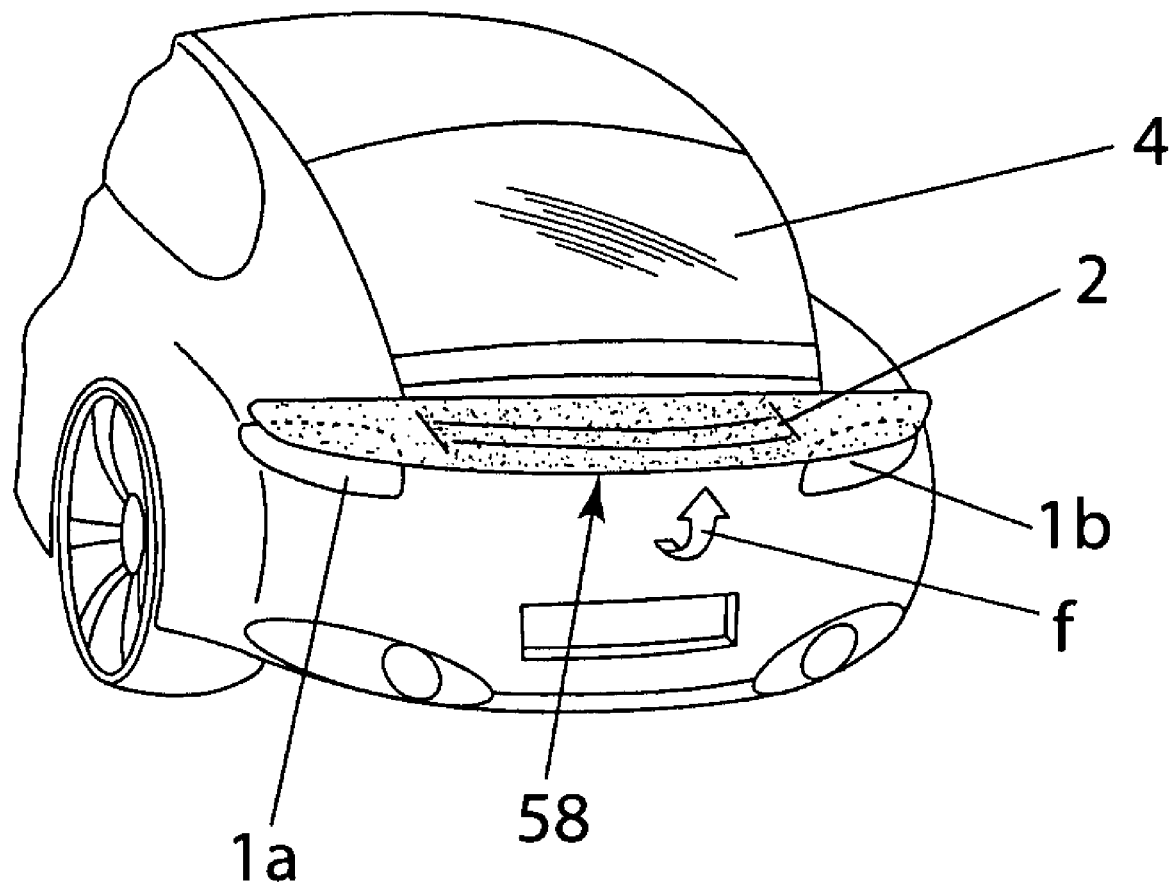

FIG. 3 shows an air guidance device 2, which can be arranged, similarly to the air guidance device 2 represented in FIG. 2, in the rear section of a motor vehicle, where the lateral marginal areas 3 of the air guidance device 2 cover at least the lighting devices 1a, 1b. The marginal devices 3, according to an embodiment of the invention, are designed to be permeable to light, preferably transparent. The center area 5 (cf. FIG. 1) is also impermeable to light in the example shown in FIG. 3.

Alternatively to the above embodiments of the invention, which were described in reference to FIGS. 2 and 3, the areas which cover at least the lighting devices 1a, 1b, particularly the marginal areas 3 (cf. FIG. 3), can also be designed in such a way that the permeability to light of the air guidance device 2, at least in the areas of the air guidance device 2 that cover the lighting devices 1a, 1b, can be adjusted by the application of an electrical potential, where the area 5 (cf. FIG. 1) of the air guidance device 2, which in the rest position is between the lighting devices 1a, 1b, is designed to be preferably permanently permeable to light, in order to conceal, for example, mechanical and/or electrical devices that may be located behind them. To adjust the light permeability of the areas of the air guidance device 2 that cover the lighting devices 1a, 1b, electrodes, which are not illustrated, can be provided in the corresponding areas. It is preferred for the marginal areas 3 of the air guidance device 2 to be designed so they can be switched electrochromatically to be transparent or nontransparent.

The invention claimed is:

1. An aerodynamic assembly for a rear section of a motor vehicle, the rear section of the motor vehicle having at least one first lighting device and at least one second lighting device, the first and second lighting devices being disposed at a respective side of the vehicle and at a spacing distance from one another in a transverse direction of the vehicle, the assembly comprising:

an air guidance device movably disposed between a rest position, wherein said air guidance device lies substantially within a vehicle contour, and an operating position, wherein said air guidance device projects beyond the vehicle contour;

said air guidance device, in the rest position thereof, covering at least partially a region between the at least one first lighting device and the at least one second lighting device; and said air guidance device having a maximum width greater than the spacing distance between the at least one first lighting device and the at least one second lighting device.

2. The aerodynamic assembly according to claim 1, wherein said air guidance device is formed with a trailing edge extending substantially over a maximum width of said air guidance device.

3. The aerodynamic assembly according to claim 1, wherein said air guidance device is formed with recesses configured so as not to cover the first and second lighting devices, or to cover the first and second lighting devices at most partially, when said air guidance device is in the rest position.

4. The aerodynamic assembly according to claim 3, wherein said air guidance device is formed with lateral and lower edges configured to follow a contour of the lighting devices.

5. The aerodynamic assembly according to claim 1, wherein said air guidance device has lateral portions covering the lighting devices, and said lateral portions are permeable to light.

6. The aerodynamic assembly according to claim 5, wherein said air guidance device in an area thereof between the lighting devices is impermeable to light.

7. The aerodynamic assembly according to claim 1, wherein said air guidance device is configured with an adjustable light permeability, by the application of an electrical potential, at least in portions of said air guidance device covering the lighting devices.

8. The aerodynamic assembly according to claim 7, wherein said air guidance device is permanently impermeable to light in an area thereof between the lighting devices.

* * * * *